United States Patent
Kapoor

(10) Patent No.: US 10,153,639 B2
(45) Date of Patent: Dec. 11, 2018

(54) POWER-DOMAIN CURRENT BALANCE

(71) Applicant: NXP B.V., Eindhoven (NL)

(72) Inventor: Ajay Kapoor, Eindhoven (NL)

(73) Assignee: NXP B.V., Eindhoven (NL)

( * ) Notice: Subject to any disclaimer, the term of this patent is extended or adjusted under 35 U.S.C. 154(b) by 356 days.

(21) Appl. No.: 14/973,575

(22) Filed: Dec. 17, 2015

(65) Prior Publication Data

US 2017/0179719 A1    Jun. 22, 2017

(51) Int. Cl.
  *G05D 3/12* (2006.01)
  *H02J 3/12* (2006.01)
  *G06F 1/32* (2006.01)
  *G05B 15/02* (2006.01)

(52) U.S. Cl.
  CPC .............. *H02J 3/12* (2013.01); *G05B 15/02* (2013.01); *G06F 1/3206* (2013.01)

(58) Field of Classification Search
  CPC ............................. H02J 3/12; G05B 15/02
  USPC ............................................. 700/298
  See application file for complete search history.

(56) References Cited

U.S. PATENT DOCUMENTS

| | | | |
|---|---|---|---|
| 7,170,267 B1 * | 1/2007 | McJimsey | H02M 3/156 323/271 |
| 8,339,177 B2 | 12/2012 | Jarrar et al. | |
| 2005/0127756 A1 | 6/2005 | Shepard et al. | |
| 2015/0346742 A1 | 12/2015 | Kapoor et al. | |

FOREIGN PATENT DOCUMENTS

EP    2 953 004 A1    12/2015

OTHER PUBLICATIONS

Ueda, Kazuhiro et al; "Low-Power On-Chip Charge-Recycling DC-DC Conversion Circuit and System"; IEEE Journal of Solid-State Circuits, vol. 48, No. 11; pp. 2608-2617; (Nov. 2013).

Gu, Jie et al; "Multi-Story Power Delivery for Supply Noise Reduction and Low Voltage Operation"; Proceedings of the 2005 Int'l Symposium on Low Power Electronics and Design, San Diego, CA USA; IEEE Piscataway, NJ, US; pp. 192-197 (Aug. 8, 2005).

Rajapandian, Saravanan et al; "Implicit DC-DC Downconversion Through Charge-Recycling"; IEEE Journal of Solid State Circuits, vol. 40, No. 4; pp. 846-852 (Apr. 2005).

Schaef, Christopher et al; "A Multilevel VR Implementation and MIMO Control Scheme for Vertically-Stacked Microprocessor Cores"; IEEE Applied Power Electronics Conference and Exposition; pp. 2090-2096 (Mar. 15, 2015).

(Continued)

*Primary Examiner* — Tan N Tran

(57) ABSTRACT

One example discloses an apparatus for power management, including: a current sink/source sensor configured to monitor a power-supply to inter-power-domain sink/source-current and to generate a current mismatch signal if the power-supply to inter-power-domain sink/source-current exceeds a threshold range; and a current imbalance controller coupled to receive the current mismatch signal and configured to generate a set of power-domain control signals; wherein the set of power-domain control signals reduce an absolute value of the power-supply to inter-power-domain sink/source-current.

21 Claims, 4 Drawing Sheets

(56) References Cited

OTHER PUBLICATIONS

"A Practical Guide to Low-Power Design"; retrieved from the internet https://www.si2.org/ . . . /PowerForward/LowPowerGuide09232009/ . . . /Ipg on Nov. 18, 2015; 110 pages (Jun. 5, 2009).

Andersen, Toke M. et al; "A 4.6 W/mm2 Power Density 86% Efficiency On-Chip Switched Capacitor DC-DC Converter in 32 nm SOI CMOS"; Twenty-Eighth Annual IEEE Applied Power Electronics Conference and Exposition, Long Beach, CA, USA; pp. 692-699 (Mar. 2013).

Hwang, Sanghoon et al; "Velocity Saturation Effects in a Short Channel Si-MOSFET and its Small Signal Characteristics"; Journal of the Korean Physical Society, vol. 55, No. 2; pp. 581-584 (Aug. 2009).

Lee, Sae Kyu et al; "A 16-core voltage-stacked system with an integrated switched-capacitor DC-DC converter"; 2015 Symposium on VLSI Circuits Digest of Technical Papers; 2 pages (2015).

Lee, Sae Kyu et al; "Evaluation of Voltage Stacking for Near-Threshold Multicore Computing"; ISLPED' 12, Redondo Beach, CA, USA, pp. 373-378 (Aug. 2012).

Liu, Yong et al; "A 0.1pJ/b 5-to-10Gb/s Charge-Recycling Stacked Low-Power I/O for On-Chip Signaling in 45nm CMOS SOI"; IEEE ISSCC 2013/Session 23/Short-Reach Links, XCVR Techniques, & PLLS; pp. 400-402 (Feb. 20, 2013).

NXP, B.V., Kapoor, A.; "Configurable Power Domain and Method"; U.S. Appl. No. 14/794,485, filed Jul. 8, 2015; 32 Pages.

NXP, B.V.; Blutman, K.L. et al; U.S. Appl. No. 14/804,411, filed Jul. 8, 2015, "Level Shifter and Approach Therefor"; 33 Pages.

Rajapandian, Saravanan et al; "High-Voltage Power Delivery Through Charge Recycling"; IEEE Journal of Solid-State Circuits, vol. 41, No. 6; pp. 1400-1010 (Jun. 2006).

Schaef, Christopher et al; "Efficient Voltage Regulation for Microprocessor Cores Stacked in Vertical Voltage Domains"; IEEE Transactions on Power Electronics, vol. 31, No. 2; pp. 1795-1808 (Feb. 2016).

\* cited by examiner

POWER-DOMAIN CURRENT BALANCE

The present specification relates to systems, methods, apparatuses, devices, articles of manufacture and instructions for power management.

Low power is a key differentiator for wide range of next generation products. With the diversity in new era of applications introduced by the Internet of things (IoT), the same computing platform may be required to operate in multiple applications. The above trend is already seen in many existing or upcoming power-performance sensitive products.

Energy minimization using charge recycling can be used for such power sensitive systems. Energy/charge recycling is applied to circuits or systems having two or more power-domains.

Energy/charge recycling are techniques for optimizing energy efficiency of a set of power-domains (e.g. circuits and/or computing platforms). Such techniques can be based on using circuit stacking (e.g. memory on top of logic) for recycling a charge, resulting in static and/or dynamic power reductions. Such techniques reduce voltage regulation power losses.

SUMMARY

According to an example embodiment, an apparatus for power management, comprising: a current sink/source sensor configured to monitor a power-supply to inter-power-domain sink/source-current and to generate a current mismatch signal if the power-supply to inter-power-domain sink/source-current exceeds a threshold range; and a current imbalance controller coupled to receive the current mismatch signal and configured to generate a set of power-domain control signals; wherein the set of power-domain control signals reduce an absolute value of the power-supply to inter-power-domain sink/source-current.

In another example embodiment, the threshold range includes zero Amps.

In another example embodiment, the power-supply to inter-power-domain sink/source-current is a current either supplied to or sunk from an electrical node in between a top power-domain and a bottom power-domain.

In another example embodiment, the top and bottom power-domains are in a stacked configuration employing charge recycling.

In another example embodiment, the top and bottom power-domains are matched circuits.

In another example embodiment, one of the power-domains is a memory circuit and another is a computational logic circuit.

In another example embodiment, the set of power-domain control signals include at least one of: a voltage control signal, a frequency control signal, and a task control signal.

In another example embodiment, further comprising a power-domain voltage controller coupled to the current imbalance controller; wherein the voltage controller adds a top power-domain voltage selection signal and a bottom power-domain voltage selection signal to the set of power-domain control signals; and wherein the voltage selection signals are configured to reduce the absolute value of the power-supply to inter-power-domain sink/source-current.

In another example embodiment, if the current mismatch signal indicates that a top power-domain current is greater than a bottom power-domain current, then the top power-domain voltage selection signal selects a reduced top power-domain voltage.

In another example embodiment, if the current mismatch signal indicates that a top power-domain current is greater than a bottom power-domain current, then the bottom power-domain voltage selection signal selects an increased bottom power-domain voltage.

In another example embodiment, further comprising a power-domain frequency controller coupled to the current imbalance controller; wherein the frequency controller adds a top power-domain frequency selection signal and a bottom power-domain frequency selection signal to the set of power-domain control signals; and wherein the frequency selection signals are configured to reduce the absolute value of the power-supply to inter-power-domain sink/source-current.

In another example embodiment, if the current mismatch signal indicates that a top power-domain current is greater than a bottom power-domain current, then the top power-domain frequency selection signal selects a reduced top power-domain frequency.

In another example embodiment, further comprising a power-domain task controller coupled to the current imbalance controller; wherein the task controller adds a top power-domain task selection signal and a bottom power-domain task selection signal to the set of power-domain control signals; and wherein the task selection signals are configured to reduce the absolute value of the power-supply to inter-power-domain sink/source-current.

In another example embodiment, if the current mismatch signal indicates that a top power-domain current is greater than a bottom power-domain current, then the top power-domain task selection signal selects a reduced load of top power-domain tasks.

In another example embodiment, the task selection signal includes at least one of: a logic selection signal, a firmware selection signal or software execute signal.

In another example embodiment, the task selection signal instructs a portion of at least one of the power-domains to turn on or off.

In another example embodiment, the task selection signal instructs a portion of at least one of the power-domains to executed a set of software instructions or not.

In another example embodiment, the current imbalance controller is an adaptive relative voltage and frequency scaling (ARVFS) controller.

According to an example embodiment, an article of manufacture including at least one non-transitory, tangible machine readable storage medium containing executable machine instructions for power management, wherein the instructions comprise: monitoring a power-supply to inter-power-domain sink/source-current; generating a current mismatch signal if the power-supply to inter-power-domain sink/source-current exceeds a threshold range; and generating a set of power-domain control signals in response to the current mismatch signal so as to reduce an absolute value of the power-supply to inter-power-domain sink/source-current.

In another example embodiment, the set of power-domain control signals include at least one of: a voltage control signal, a frequency control signal, a task control signal and a substrate bias control signal.

In another example embodiment, further comprising: initializing the voltage, frequency and task control signals to a set of values at a time when the article is powered on.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1:
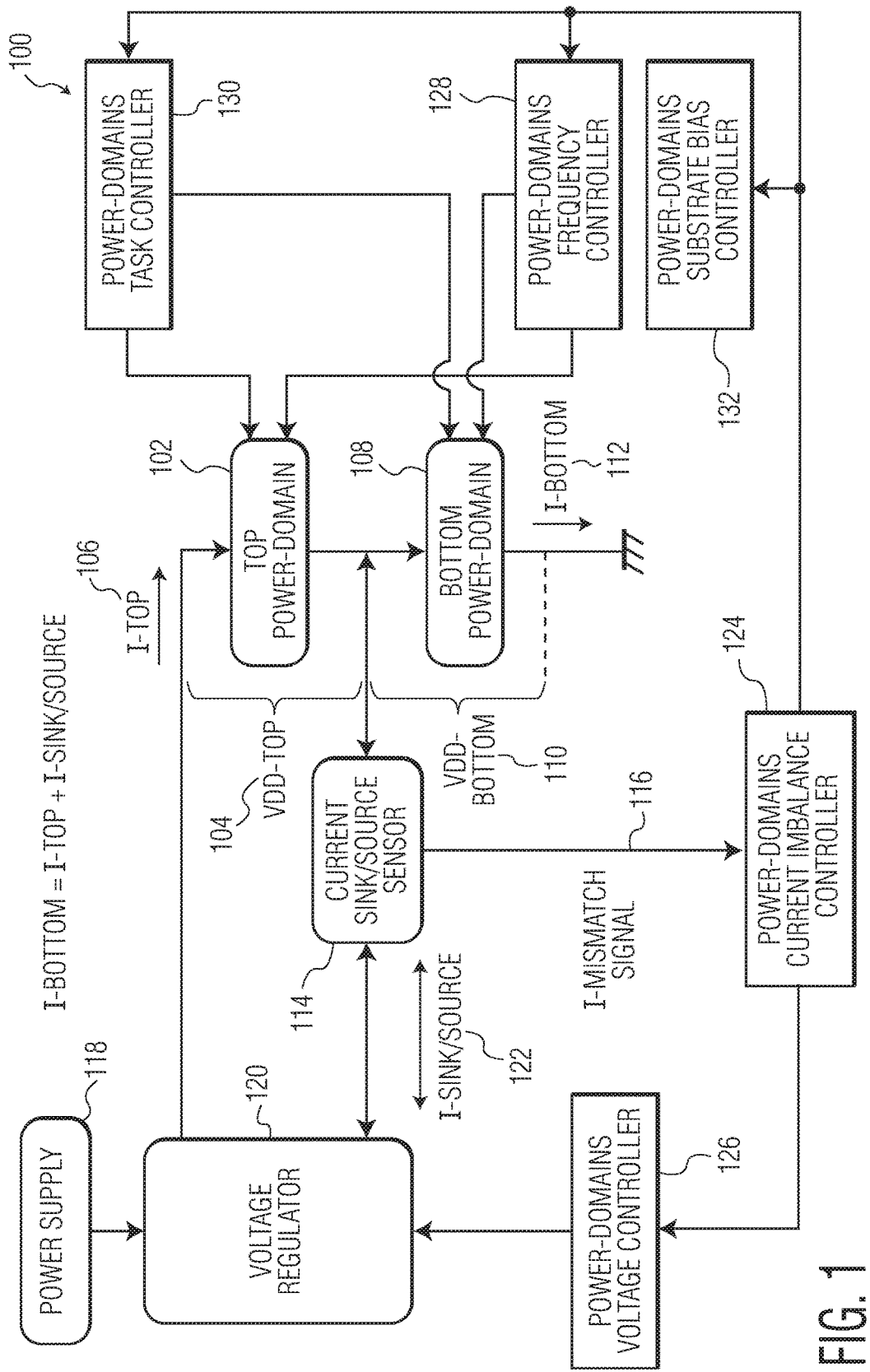
FIG. 1 is one example of an apparatus for power-domain current balance.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

The effectiveness of energy/charge recycling techniques however can be limited due to energy consumption mismatch between the set of power-domains.

Circuit partitioning has a direct effect on how well energy/charge recycling and load-balancing (i.e. minimizing the current variations) can be optimized between two or more power-domains.

In one approach to load-balancing, a circuit is to partition the circuit into two or more almost equal current consuming blocks (i.e. symmetric/mirrored circuit partitioning). For example, in a dual-CPU system where, one CPU is in the top power-domain and second CPU is in the bottom power-domain. Similarly, other functionalities like memory (SRAM) may also be equally split between two or more power-domains. Such mirrored functionalities enables the top and bottom power-domains to be as identical as possible and run at the same voltages and frequencies.

However, even if the power-domains are divided into two equal/symmetric functional halves, this only makes their intrinsic capacitances equal. Where I-top (i.e. current for the top power-domain) is approximately equal to I-bottom (i.e. current for the bottom power-domain), thin his can mathematically be expressed as:

$$(aCVf) \text{ of top power-domain} \sim (aCVf) \text{ of bottom power-domain} \quad \text{Eqn. 1}$$

Where, 'a': activity, 'C': intrinsic capacitance, 'V': Voltage (e.g. VDD-top and VDD-bottom) and 'f': frequency. Thus in such a design, efficient charge recycling occurs when both CPUs or subsystems are consuming equal or almost equal currents.

Variations between the tasks performed (i.e. software code executed) by such dual CPUs also leads to current imbalances since their activity factors ('a') will be different for different tasks and/or software even if 'C' is balanced.

In other examples such symmetric/mirrored functionalities may either not be possible or preferable. For example, a CPU in a top-power-domain may require a first voltage and frequency, while a memory in the bottom-power-domain may require a second different voltage and frequency. These different functionalities can also have unequal current requirements. For example, memory consumes 20-40% less power than the logic in an MCU or CPU.

Circuits using a set of adaptive relative voltage and frequency scaling (ARVFS) techniques, including task scheduling, for limiting energy/charge and current mismatches between a set of power-domains are now discussed. These circuits and techniques better align current consumption and thus load-balancing between a set of power-domains.

While the example embodiments often discussed are for a set of stacked (i.e. shared current) power-domains, these techniques can also be used for flat (i.e. shared voltage) circuit designs. Also, while these example embodiments discuss power management techniques for just two stacked power-domains, these techniques can be scaled to three or more stacked or flat domains as well.

FIG. 1 is one example of an apparatus 100 for power-domain current balance. The apparatus 100 includes a top power-domain 102 energized by a top voltage (VDD-top) 104 and a top current (I-top) 106, a bottom power-domain 108 energized by a bottom voltage (VDD-bottom) 110 and a bottom current (I-bottom) 112, a current sink/source sensor 114 outputting a current mismatch signal (I-mismatch/I-imbalance signal) 116.

Signal level-shifters (not shown) between the top and bottom power-domains 102, 108 enable a first set of analog and/or digital voltage signal ranges defined for the top power-domain 102 to be translated into a second set of analog and/or digital voltage signal ranges defined for the bottom power-domain 108 thereby enabling proper communication between these power-domains 102, 108.

The top and bottom power-domains 102, 108 attributes vary depending upon their application. In various embodiments the power-domains 102, 108 could be matched circuits, or one could be a memory circuit and the other a computational logic circuit (e.g. memory on top of logic MOTL configuration).

The top and bottom power-domains 102, 108 can have different power consumption profiles based on their operational tasks (e.g. logic, firmware and/or software functionalities), operating voltages and/or operating frequencies. In some example embodiments the task load can be varied by either turning on or off circuits in one or more of the power-domain's 102, 108 or by reapportioning the software executed by each of the power-domains 102, 108.

A power supply 118 supplies the voltage and current to the top and bottom power-domains 102, 108. The power supply 118 is connected to a voltage regulator 120 and not only supplies top current (I-top) 106 and bottom current (I-top) 112 to the power-domains 102, 108 but also supplies a sink/source current (I-sink/source) 122 as necessary. Note: I-bottom=I-top±I-sink/source.

A current imbalance controller 124 receives the current mismatch signal (I-mismatch signal) 116 and reduces any current imbalances between the top and bottom power-domains 102, 108. The current imbalance controller 124 reduces the current imbalances between the top and bottom power-domains 102, 108 using a voltage controller 126, a frequency controller 128, a task controller 130 and/or a substrate bias controller 132. These controllers ensure an embedded close-loop control loop architecture and provides negative feedback to compensate for the imbalance.

In one example embodiment, the current sink/source sensor 114 is configured to monitor a power-supply to inter-power-domain sink/source-current (i.e. the sink/source current 122). The power-supply to inter-power-domain sink/source-current is a current either supplied to or sunk from an electrical node in between a top power-domain and a bottom power-domain as shown in FIG. 1. This electrical node in one example can also be used to monitor the bottom voltage (VDD-bottom) 110 or the top voltage (VDD-top) 104, depending upon the current sink/source sensor's 114 configuration.

The current sink/source sensor 114 generates the current mismatch signal 116 if the power-supply to inter-power-domain sink/source-current 122 exceeds a threshold range. An example threshold range could be +/−1 μA centered about 0 Amps, or may be offset and centered about a non-zero current or voltage level. For this, there is hysteresis built in to provide stability in the loop control.

The current imbalance controller 124 receives and monitors the current mismatch signal 116, which in various embodiments may also include receiving and monitoring the threshold range. The current imbalance controller 124 generates a set of power-domain control signals which are sent to one or more of the power-domains 102, 108 to reduce an absolute value of the power-supply to inter-power-domain sink/source-current.

In one example the power-domain current imbalance controller 124 contains logic, firmware and/or software configured to use adaptive relative voltage and frequency scaling (ARVFS) techniques to reduce any current mismatch. The ARVFS techniques are monitor an amount of current mismatch between the power-domains (e.g. the stacked elements) and adjusts voltage, frequency and task assignments (e.g. logic, firmware and/or software functionalities) as control elements to compensate for any load-imbalance. In one example, the instructions are part of an embedded control loop.

Examples of current imbalance controller 124 operation using the voltage, frequency, task and substrate bias controllers 126, 128, 130, 132 is now presented.

Note that the current imbalance controller 124 is constrained in an ability to vary the voltage, frequency and task assignments due to the physical design of the power-domains 102, 108 (i.e. maximum and minimum operating voltages and frequencies, as well as ability to execute certain tasks). Such constraints can include: Minimum throughput of individual power-domains or combined total throughput of two power-domains; Voltage headroom for individual power-domains and/or the total headroom for two power-domains (i.e. V-top+V-bottom); and Allowed frequency Vs Voltage of each power-domain, (i.e. interdependency of voltage and frequency).

The voltage controller 126 adds a top power-domain voltage selection signal and a bottom power-domain voltage selection signal to the set of power-domain control signals. These voltage selection signals are configured to reduce the absolute value of the power-supply to inter-power-domain sink/source-current.

For example, if the current mismatch signal 116 indicates that the top power-domain current 106 is greater than the bottom power-domain current 112, then the top power-domain voltage selection signal can select a reduced top power-domain voltage, or the bottom power-domain voltage selection signal can select an increased bottom power-domain voltage.

The frequency controller 128 adds a top power-domain frequency selection signal and a bottom power-domain frequency selection signal to the set of power-domain control signals. These frequency selection signals can also be configured to reduce the absolute value of the power-supply to inter-power-domain sink/source-current.

For example, if the current mismatch signal indicates that the top power-domain current 106 is greater than the bottom power-domain current 112, then the top power-domain frequency selection signal can select a reduced top power-domain frequency.

The task controller 130 adds a top power-domain task selection signal and a bottom power-domain task selection signal to the set of power-domain control signals. These task selection signals can similarly be configured to reduce the absolute value of the power-supply to inter-power-domain sink/source-current.

For example, if the current mismatch signal indicates that a top power-domain current is greater than a bottom power-domain current, then the top power-domain task selection signal can select a reduced load of top power-domain tasks. The task selection signal includes at least one of: a logic selection signal, a firmware selection signal or software execute signal. In various examples, the task selection signal can instruct a portion of at least one of the power-domains to turn on or off or to execute a set of software instructions or not.

The substrate bias controller 132 include substrate bias signals which can alter either the top or bottom power-domain's 102, 108 current consumption so as to reduce the absolute value of the power-supply to inter-power-domain sink/source-current.

In various examples, the current imbalance controller 124 can target a minimum mismatch current (i.e. sink/source current (I-sink/source) 122) using recursive steps such as in a Newton-Raphson algorithm. In other examples, the current imbalance controller 124 can target a minimum mismatch current 122 by directly observing the amount of mismatch current (i.e. the sink/source current (I-sink/source) 122) and calculating or accessing a look-up table (e.g. memory map) to determine an amount of voltage, frequency and/or task adjustment needed to balance the I-top 106 and I-bottom 112 currents.

The current imbalance controller 124 can operate in either a static or dynamic mode. In the static mode the current imbalance controller 124 reduces a circuit's standby mismatch current. In another example embodiment, the power-domain current imbalance controller 124 operates in a dynamic mode, such to reduce a circuit's real-time operational mismatch current.

Example of current imbalance controller 124 operation using just the voltage controller 126 and frequency controller 128 are now presented. In one example, when I-top 106>I-bottom 112, the current imbalance controller 124 can reduce VDD-top 104 and/or f-top relative to VDD-bottom 110 and/or f-bottom respectively.

However, such a VDD-top 104 reduction will increase the top power-domain's critical path delay T-top. T-top is herein defined as a longest register to register delay, software code execution delay, and the like within the top power-domain 102. T-top varies with the tasks, logic, software, etc. assigned to the top power-domain 102.

To overcome the increase in T-top, VDD-bottom 110 can be raised such that a total circuit critical path delay (i.e. T-top+T-bottom) remains the same.

Alternatively, VDD-bottom 110 and/or f-bottom can be increased relative to VDD-top 104 and/or f-top respectively. In another alternative example VDD-bottom 110, f-bottom, VDD-top 104 and f-top are all adjusted at same time (e.g., increase for one power-domain and decrease for the other power-domain).

In another example, if voltage and frequency are both reduced, then first reduce the frequency, and second reduce the voltage and reverse order is followed for the increase (if traditional DVFS like scaling mechanism is deployed is applied).

The example techniques just discussed can be reversed if I-top<I-bottom

Note that when the apparatus 100 is first energized, the top voltage (VDD-top) 104, the top frequency (f-top) and the top task load may or may not be equal to the bottom voltage (VDD-bottom) 110, the bottom frequency (f-bottom) and the bottom task load.

So while a symmetrically partitioned system may start with equal values, an asymmetric partitioned system may choose differentiated values. For example, when a memory (e.g. SRAM) is in the top power-domain 102 and logic (e.g. a CPU) is in the bottom power-domain 108, the CPU may be first energized at 0.7V while the SRAM is first energized at 1.1V, while both are operating at the same frequency.

Figure 2:
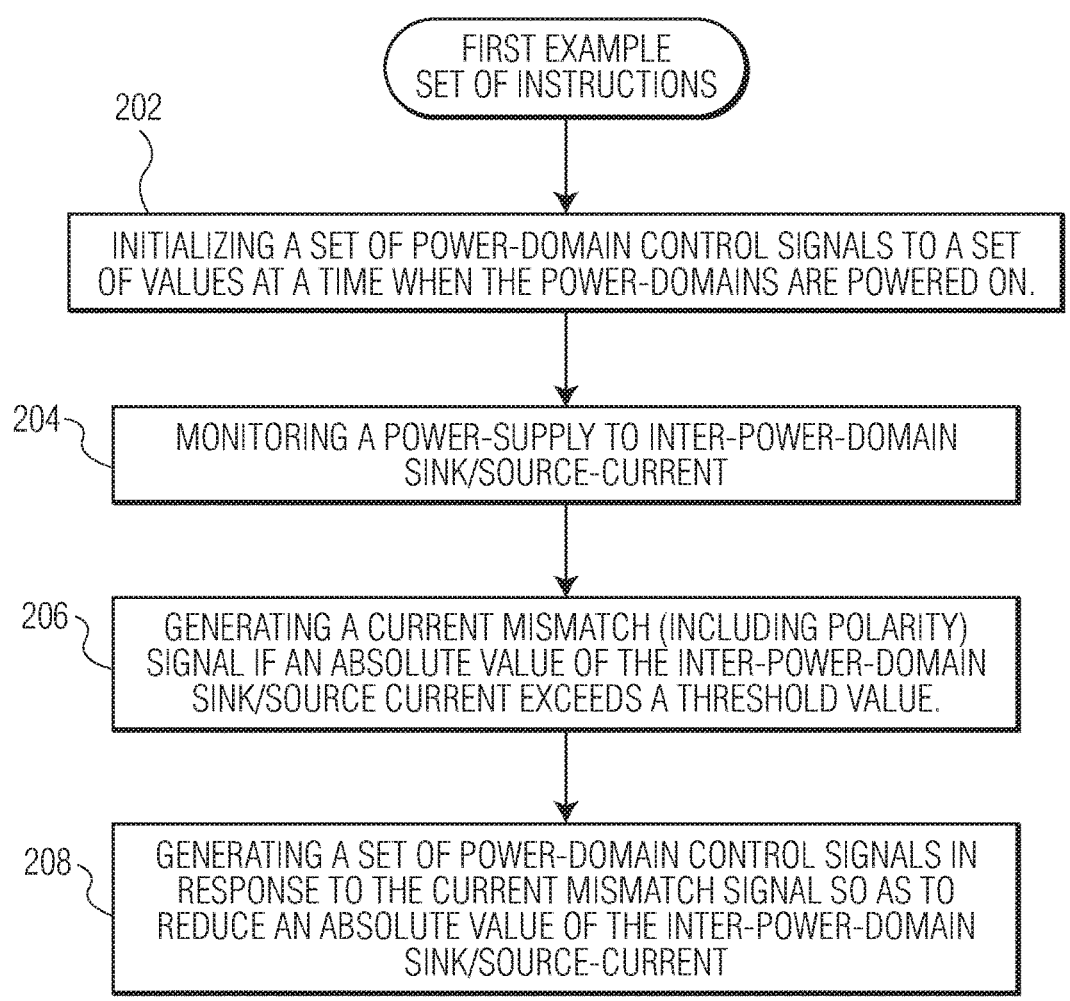
FIG. 2 is one example of a set of instructions for power-domain current balancing.

FIG. 2 is one example of a set of instructions for power-domain current balancing. The order in which the instructions are discussed does not limit the order in which other example embodiments implement the instructions unless otherwise specifically stated. Additionally, in some embodiments the instructions are implemented concurrently.

A first example instruction set begins in 202, by initializing a set of power-domain control signals to a set of values at a time when the power-domains are powered on. The set of power-domain control signals include at least one of: a voltage control signal, a frequency control signal and a task control signal.

Next in 204, monitoring a power-supply to inter-power-domain sink/source-current. In 206, generating a current mismatch (including polarity) signal if an absolute value of the inter-power-domain sink/source current exceeds a threshold value. Then in 208, generating a set of power-domain control signals in response to the current mismatch signal so as to reduce an absolute value of the inter-power-domain sink/source-current.

Figure 3:
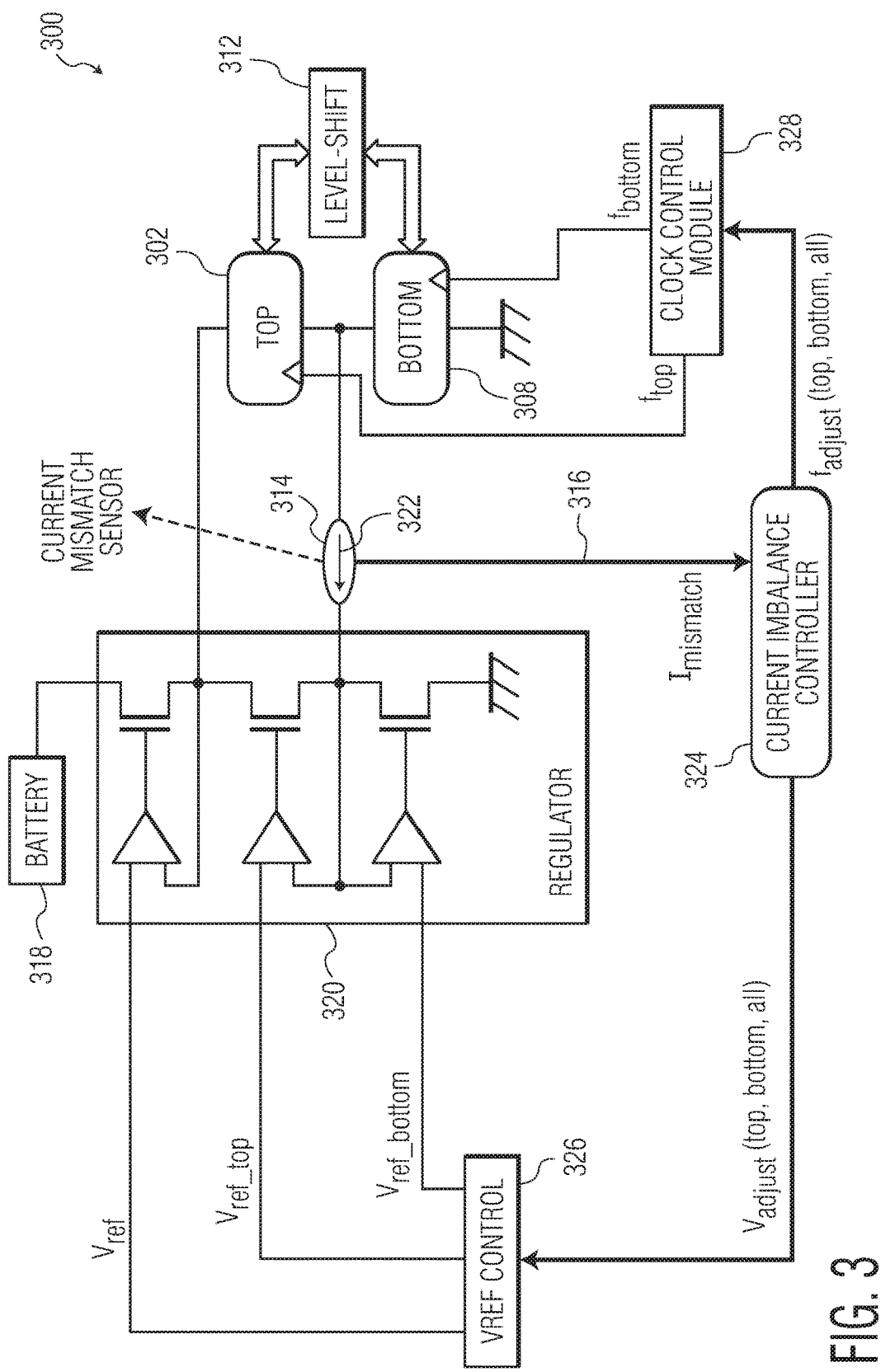
FIG. 3 is another example of an apparatus for power-domain current balance.

FIG. 3 is another example of an apparatus 300 for power-domain current balance. The apparatus 300 includes a top power-domain 302 energized by a top voltage (VDD-top) and a top current (I-top), a bottom power-domain 308 energized by a bottom voltage (VDD-bottom) and a bottom current (I-bottom), a current sink/source sensor 314 outputting a current mismatch signal (I-mismatch/I-imbalance signal) 316.

Signal level-shifters 312 between the top and bottom power-domains 302, 308 enable a first set of analog and/or digital voltage signal ranges defined for the top power-domain 302 to be translated into a second set of analog and/or digital voltage signal ranges defined for the bottom power-domain 308 thereby enabling proper communication between these power-domains 302, 308.

The top and bottom power-domains 302, 308 have different power consumption profiles based on their operational tasks (e.g. logic, firmware and/or software functionalities), operating voltages and/or operating frequencies.

A battery 318 supplies the voltage and current to the top and bottom power-domains 302, 308. The battery 318 is connected to a voltage regulator 320 (an LDO regulator topology shown, however switch-capacitor can also be used) and not only supplies top current (I-top), top voltage (VDD-top), bottom current (I-top) and bottom voltage (VDD-bottom) to the power-domains 302, 308 but also supplies a sink/source current (I-sink/source) 322 as necessary.

A current imbalance controller 324 receives the current mismatch signal (I-mismatch signal) 316 and reduces any current imbalances between the top and bottom power-domains 302, 308. The current imbalance controller 324 reduces the current imbalances between the top and bottom power-domains 302, 308 using a V-ref control 326, a clock control module 328, and a task controller (not shown).

In one example embodiment, the sink/source current (I-sink/source) 322 is fed to a control loop of the current imbalance controller 324 so that adjustments to each power-domain's 302, 308 voltages, frequencies and tasks can be made.

Figure 4:
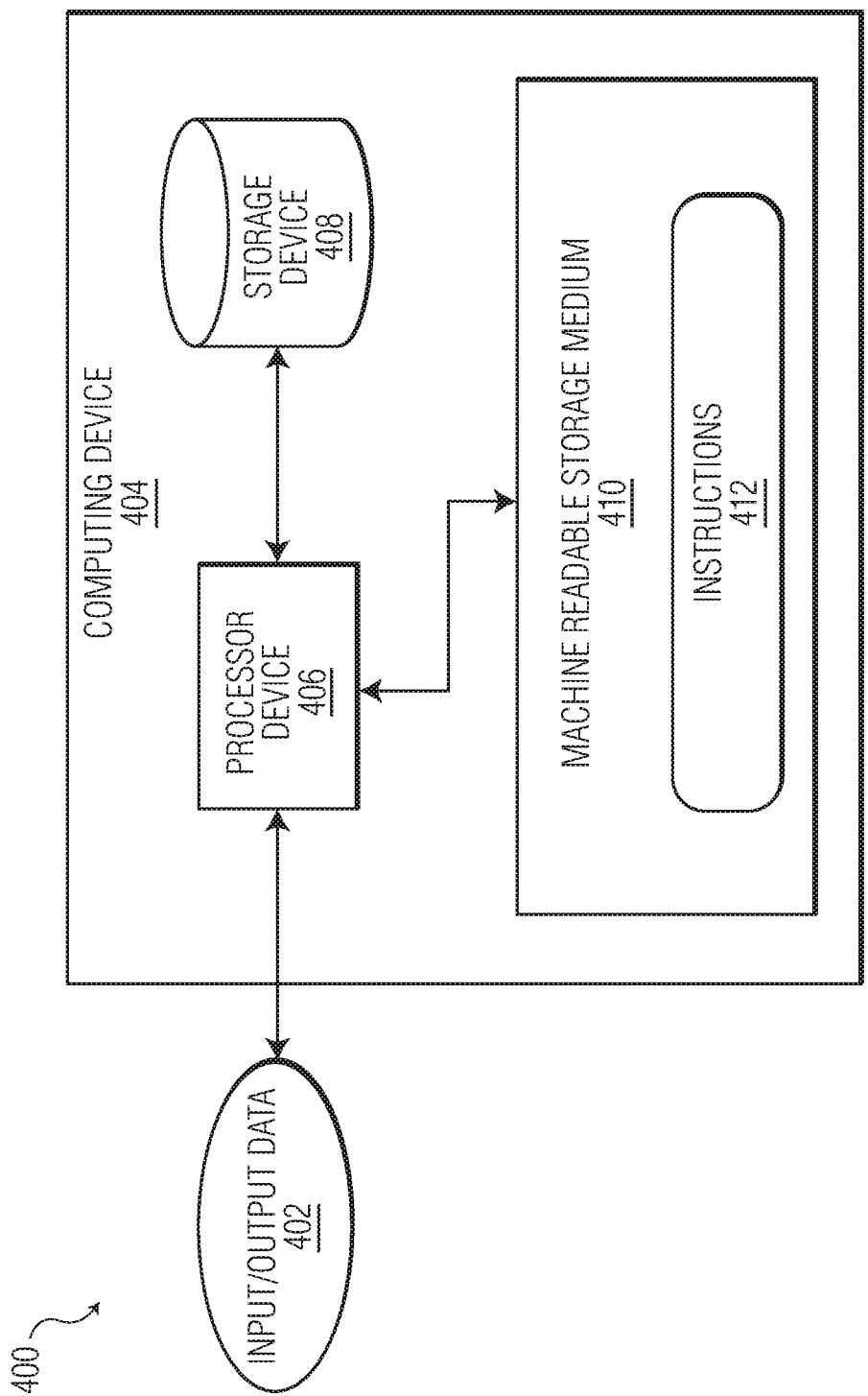
FIG. 4 is an example system for hosting instructions for enabling a power-domain current balancing apparatus.

FIG. 4 is an example system for hosting instructions for enabling a power-domain current balancing apparatus. The system 400 shows an input/output data 402 interface with an electronic apparatus 404. The electronic apparatus 404 includes a processor 406, a storage device 408, and a non-transient machine-readable storage medium 410. The machine-readable storage medium 410 includes instructions 412 which control how the processor 406 receives input data 402 and transforms the input data into output data 402, using data within the storage device 408. Example instructions 412 stored in the machine-readable storage medium 410 are discussed elsewhere in this specification. The machine-readable storage medium in an alternate example embodiment is a non-transient computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transient machine-readable storage medium using a bus and performs operations and tasks that implement one or more instructions stored in the machine-readable storage medium. The machine-readable storage medium in an alternate example embodiment is a computer-readable storage medium.

The instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions described above are implemented as functional and software instructions embodied as a set of executable instructions in a non-transient computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. An apparatus for power management, comprising:
a current sink/source sensor configured to monitor a power-supply to inter-power-domain sink/source-current and to generate a current mismatch signal if the power-supply to inter-power-domain sink/source-current exceeds a threshold range; and
a current imbalance controller coupled to receive the current mismatch signal and configured to generate a set of power-domain control signals;
wherein the set of power-domain control signals reduce an absolute value of the power-supply to inter-power-domain sink/source-current.

2. The apparatus of claim 1:
wherein the threshold range includes zero Amps.

3. The apparatus of claim 1:
wherein the power-supply to inter-power-domain sink/source-current is a current either supplied to or sunk from an electrical node in between a top power-domain and a bottom power-domain.

4. The apparatus of claim 3:
wherein the top and bottom power-domains are in a stacked configuration employing charge recycling.

5. The apparatus of claim 3:
wherein the top and bottom power-domains are matched circuits.

6. The apparatus of claim 3:
wherein one of the power-domains is a memory circuit and another is a computational logic circuit.

7. The apparatus of claim 1:
wherein the set of power-domain control signals include at least one of: a voltage control signal, a frequency control signal, and a task control signal.

8. The apparatus of claim 1:
further comprising a power-domain voltage controller coupled to the current imbalance controller;
wherein the voltage controller adds a top power-domain voltage selection signal and a bottom power-domain voltage selection signal to the set of power-domain control signals; and
wherein the voltage selection signals are configured to reduce the absolute value of the power-supply to inter-power-domain sink/source-current.

9. The apparatus of claim 8:
wherein if the current mismatch signal indicates that a top power-domain current is greater than a bottom power-domain current, then the top power-domain voltage selection signal selects a reduced top power-domain voltage.

10. The apparatus of claim 8:
wherein if the current mismatch signal indicates that a top power-domain current is greater than a bottom power-domain current, then the bottom power-domain voltage selection signal selects an increased bottom power-domain voltage.

11. The apparatus of claim 1:
further comprising a power-domain frequency controller coupled to the current imbalance controller;
wherein the frequency controller adds a top power-domain frequency selection signal and a bottom power-domain frequency selection signal to the set of power-domain control signals; and
wherein the frequency selection signals are configured to reduce the absolute value of the power-supply to inter-power-domain sink/source-current.

12. The apparatus of claim 11:
wherein if the current mismatch signal indicates that a top power-domain current is greater than a bottom power-domain current, then the top power-domain frequency selection signal selects a reduced top power-domain frequency.

13. The apparatus of claim 1:
further comprising a power-domain task controller coupled to the current imbalance controller;
wherein the task controller adds a top power-domain task selection signal and a bottom power-domain task selection signal to the set of power-domain control signals; and
wherein the task selection signals are configured to reduce the absolute value of the power-supply to inter-power-domain sink/source-current.

14. The apparatus of claim 13:
wherein if the current mismatch signal indicates that a top power-domain current is greater than a bottom power-domain current, then the top power-domain task selection signal selects a reduced load of top power-domain tasks.

15. The apparatus of claim 13:
wherein the task selection signal includes at least one of: a logic selection signal, a firmware selection signal or software execute signal.

16. The apparatus of claim 13:
wherein the task selection signal instructs a portion of at least one of the power-domains to turn on or off.

17. The apparatus of claim 13:
wherein the task selection signal instructs a portion of at least one of the power-domains to executed a set of software instructions or not.

18. The apparatus of claim 1:
wherein the current imbalance controller is an adaptive relative voltage and frequency scaling (ARVFS) controller.

19. An article of manufacture including at least one non-transitory, tangible machine readable storage medium containing executable machine instructions for power management, wherein the instructions comprise:
monitoring a power-supply to inter-power-domain sink/source-current;

generating a current mismatch signal if the power-supply to inter-power-domain sink/source-current exceeds a threshold range; and generating a set of power-domain control signals in response to the current mismatch signal so as to reduce an absolute value of the power-supply to inter-power-domain sink/source-current.

20. The article of claim 19:

wherein the set of power-domain control signals include at least one of: a voltage control signal, a frequency control signal, a task control signal and a substrate bias control signal.

21. The article of claim 20, wherein the instructions further comprise:

initializing the voltage, frequency and task control signals to a set of values at a time when the article is powered on.

* * * * *